(12) United States Patent
Nakagawa et al.

(10) Patent No.: US 9,389,309 B2
(45) Date of Patent: Jul. 12, 2016

(54) RADAR DEVICE
(71) Applicant: Panasonic Corporation, Osaka (JP)
(72) Inventors: Yoichi Nakagawa, Tokyo (JP); Tadashi Morita, Kanagawa (JP); Takaaki Kishigami, Tokyo (JP)
(73) Assignee: Panasonic Corporation, Osaka (JP)
( * ) Notice: Subject to any disclaimer, the term of this patent is extended or adjusted under 35 U.S.C. 154(b) by 0 days.
(21) Appl. No.: 14/401,812
(22) PCT Filed: Mar. 3, 2014
(86) PCT No.: PCT/JP2014/001147
§ 371 (c)(1),
(2) Date: Nov. 17, 2014
(87) PCT Pub. No.: WO2014/147980
PCT Pub. Date: Sep. 25, 2014
(65) Prior Publication Data
US 2015/0168546 A1      Jun. 18, 2015
(30) Foreign Application Priority Data

Mar. 18, 2013   (JP) ................................ 2013-055564

(51) Int. Cl.
*G01S 13/24* (2006.01)
*G01S 7/42* (2006.01)
(Continued)
(52) U.S. Cl.
CPC .............. *G01S 13/0209* (2013.01); *G01S 7/282* (2013.01); *G01S 7/2813* (2013.01); *G01S 7/42* (2013.01);
(Continued)
(58) Field of Classification Search
CPC ........... G01S 7/02; G01S 7/28; G01S 7/2813; G01S 7/282; G01S 7/42; G01S 13/02; G01S 13/0209; G01S 13/06; G01S 13/08; G01S 13/10; G01S 13/24; G01S 13/87; G01S 13/88; G01S 13/93; G01S 13/931; G01S 2013/9371; G01S 2013/9375; G01S 13/003; G01S 13/89; G01S 13/90; G01S 13/32; G01S 13/34; G01S 13/345; G01V 3/15; G01V 3/17

USPC ......... 342/27, 28, 70–72, 118, 146–158, 175, 342/195, 59, 128, 130–132, 159, 21, 22, 342/134, 135
See application file for complete search history.

(56) References Cited

U.S. PATENT DOCUMENTS 3,161,870 A * 12/1964 Pincoffs .................. G01S 13/87
                                                        342/59
3,351,936 A * 11/1967 Feder ....................... G01V 3/17
                                                        324/330
(Continued)

FOREIGN PATENT DOCUMENTS

| JP | 2010-249535 A | 11/2010 |
| JP | 2012-42372 A | 3/2012 |
| JP | 2012-107947 A | 6/2012 |

OTHER PUBLICATIONS

Fuhl et al., "Unified channel model for mobile radio systems with smart antennas," IEE Proc.-Radar, Sonar Navig., 145 (1):32-41, 1998.

(Continued)

*Primary Examiner* — Bernarr Gregory
(74) *Attorney, Agent, or Firm* — Seed IP Law Group PLLC

(57) ABSTRACT

First and second radar modules include channel controllers which set different frequency bands for first and second carrier waves, respectively, and first radar transmitter and receiver which transmit radio-frequency first and second radar transmission signals generated using prescribed first and second transmission code sequences and the first and second carrier waves, which receive first and second radar reflection signals produced as a result of reflection of the first and second radar transmission signals by a target, and which convert them into baseband first and second reception signals. A signal processor performs prescribed combining processing on outputs of the first and second radar modules. The first and second radar transmission signals partially overlap with each other in main beam directivity.

3 Claims, 12 Drawing Sheets

(51) Int. Cl.
*G01S 13/02* (2006.01)
*G01S 7/282* (2006.01)
*G01S 13/87* (2006.01)
*G01S 13/93* (2006.01)
*G01S 7/28* (2006.01)
*G01S 13/00* (2006.01)
*G01S 7/00* (2006.01)

(52) U.S. Cl.
CPC .................. *G01S 13/24* (2013.01); *G01S 13/87* (2013.01); *G01S 13/931* (2013.01); *G01S 2013/9375* (2013.01)

(56) References Cited

U.S. PATENT DOCUMENTS

| | | | | |
|---|---|---|---|---|
| 3,665,466 | A * | 5/1972 | Hibbard | G01S 13/345 324/330 |
| 4,309,703 | A * | 1/1982 | Blahut | G01S 13/90 342/132 |
| 4,427,982 | A * | 1/1984 | Caprio | G01S 7/282 342/159 |
| 5,724,042 | A * | 3/1998 | Komatsu | G01S 13/931 342/175 |
| 5,933,109 | A * | 8/1999 | Tohya | G01S 13/931 342/175 |
| 5,945,939 | A * | 8/1999 | Iihoshi | G01S 13/34 342/112 |
| 6,064,331 | A * | 5/2000 | Avila | G01S 13/87 342/118 |
| 6,377,204 | B1 * | 4/2002 | Wurman | G01S 13/003 342/147 |
| 6,762,711 | B1 | 7/2004 | Doerfler | |
| 6,867,727 | B1 * | 3/2005 | Mitra | H01Q 3/242 342/175 |
| 6,995,706 | B2 * | 2/2006 | Ohlsson | G01S 13/24 342/118 |
| 7,215,278 | B2 * | 5/2007 | Bandhauer | G01S 13/87 342/159 |
| 8,334,802 | B2 * | 12/2012 | Ogawa | G01S 13/931 342/118 |
| 2005/0179584 | A1 | 8/2005 | Ohlsson | |
| 2013/0241766 | A1 | 9/2013 | Kishigami et al. | |

OTHER PUBLICATIONS

International Search Report, mailed Jun. 3, 2014, for International Application No. PCT/JP2014/001147, 4 pages.
Kishigami et al., "A basic study on high precision detection method for multiple targets by 79GHz band radar system," IEICE, A-17-18, pp. 286, 2012. Mar. 20, 2012.
Extended European Search Report dated Mar. 3, 2016, for Corresponding EP Application No. 14770032.2-1812 / 2977784, 10 pages.

* cited by examiner

FIG. 1
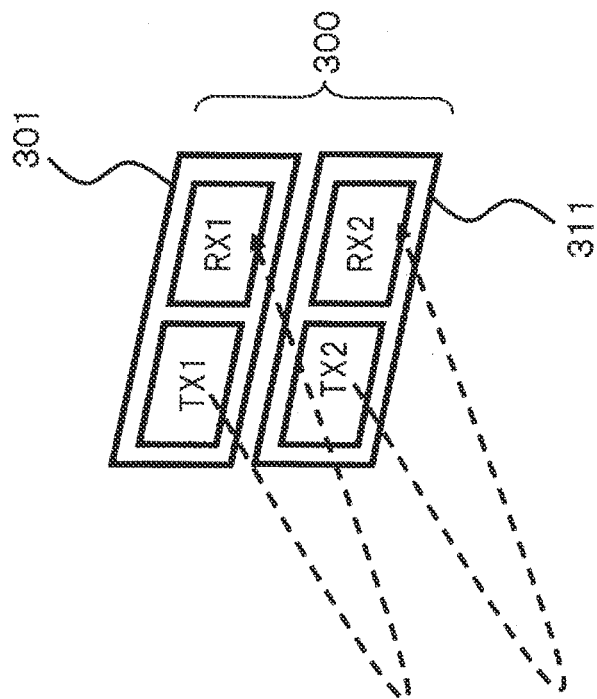
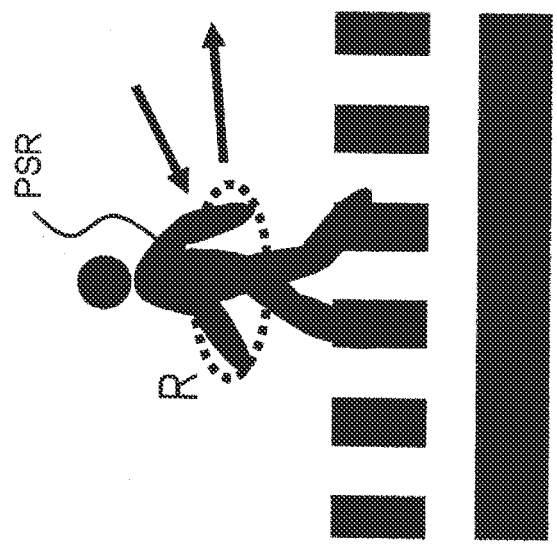

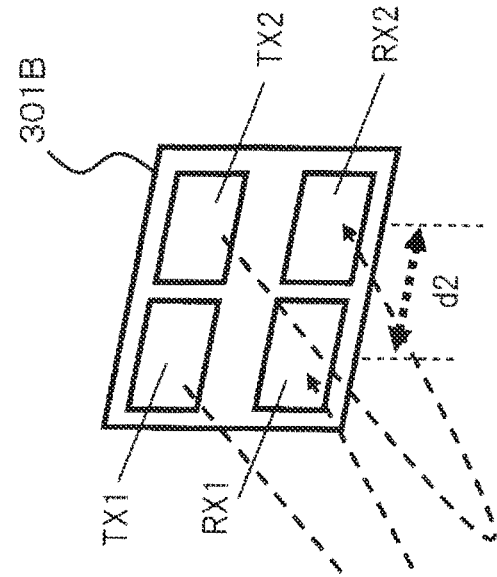
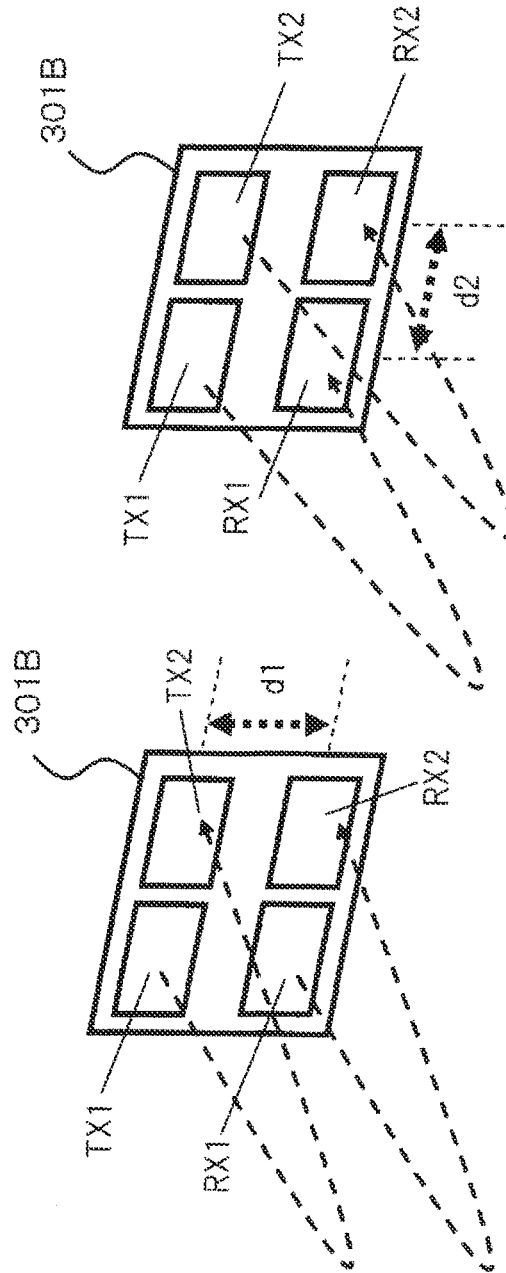

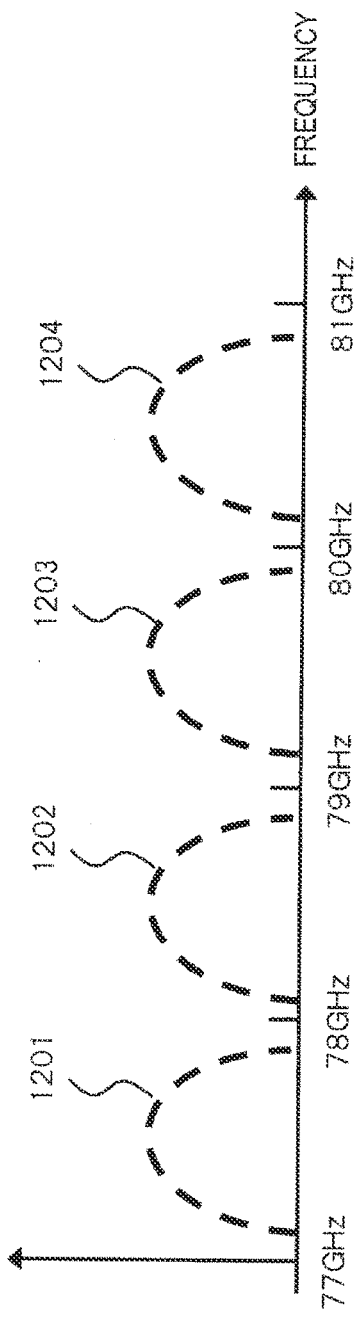
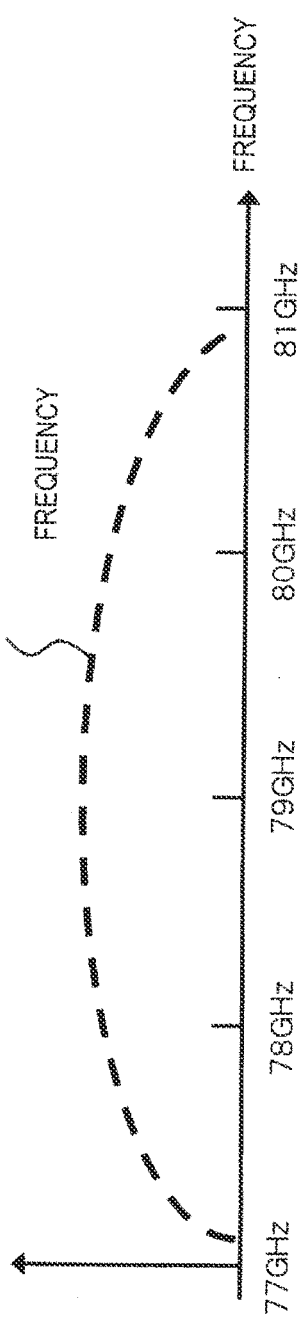
FIG. 12(A)
FIG. 12(B)

RADAR DEVICE

TECHNICAL FIELD

The present disclosure relates to a radar apparatus which transmits a radio-frequency radar transmission signal.

BACKGROUND ART

A radar apparatus transmits a radio-frequency (e.g., microwave or millimeter wave) radar transmission signal from a measuring site to the space in every transmission cycle, receive a reflection wave signal reflected from a target, and measure at least one of a distance between the measuring site and the target and a direction of the target.

At present, radar apparatus which transmit a millimeter-wave radar transmission signal (hereinafter referred to as "millimeter-wave radars") are put in practical use as vehicle-mounted devices such as forward-looking sensors for mainly detecting vehicles (e.g., cars, buses, trucks). Development of radar apparatus to serve as vehicle-mounted millimeter-wave radars which have such a high angular resolution as to resolve distant lanes and enable stable detection of vehicles is desired.

Among related art vehicle-mounted millimeter-wave radars is a radar apparatus which detects a vehicle by transmitting three or more millimeter-wave main beams in such a manner that two adjoining ones of them overlap with each other by what is called sequential roving which is a technique of switching the main beam direction sequentially in a horizontal plane (refer to Patent document 1, for example).

In Japan, at present, for example, high-resolution radar apparatus for detecting a pedestrian or a bicycle are assigned UWB (ultra wideband) bands of 24 GHz and 26 GHz and a 79 GHz frequency band. In view of future diffusion rates of radar systems, it is expected that the 79 GHz frequency band (e.g., 77 to 81 GHz) will be allocated to vehicle-mounted radar apparatus, rather than the UWB bands of 24 GHz and 26 GHz for which use restrictions are set.

RELATED ART DOCUMENTS

Patent Documents

Patent document 1: U.S. Pat. No. 6,762,711

SUMMARY OF THE INVENTION

Problem to be Solved by the Invention

The present inventors have studied radar apparatus which transmit radio-frequency radar transmission signal. However, although Patent document 1 intends to detect a target (e.g., vehicle) having a small number of dominant scattering points that reflect a radar transmission signal, it is not thought to be directed to detecting, in a stable manner, a target (e.g., human body) having many dominant scattering points.

The present disclosure has been made to solve the above problem, and an object thereof is to provide a radar apparatus capable of detecting, in a stable manner, a target having many dominant scattering points that reflect a radar transmission signal.

Means for Solving the Problem

The present disclosure provides radar apparatus including: a first radar module; a second radar module; and a signal processor which combines outputs of the first radar module and the second radar module, wherein the first radar module includes: a first channel controller which sets a frequency band of a first carrier wave to a frequency band different from a frequency band of a second carrier wave; and a first radar transmitter and receiver which transmits a radio-frequency first radar transmission signal generated using a prescribed first transmission code sequence and the first carrier wave, which receives a first radar reflection signal produced as a result of reflection of the first radar transmission signal by a target, and which converts the first radar reflection signal into a baseband first reception signal, wherein the second radar module includes: a second channel controller which sets the frequency band of the second carrier wave to a frequency band different from the frequency band of the first carrier wave; and a second radar transmitter and receiver which transmits a radio-frequency second radar transmission signal generated using a prescribed second transmission code sequence and the second carrier wave, which receives a second radar reflection signal produced as a result of reflection of the second radar transmission signal by the target, and which converts the second radar reflection signal into a baseband second reception signal, and wherein a part of main beam directivity of the first radar transmission signal overlaps with a part of main beam directivity of the second radar transmission signal.

Advantages of the Invention

According to the present disclosure, it is possible to detect, in a stable manner, a target having many dominant scattering points that reflect a radar transmission signal.

BRIEF DESCRIPTION OF THE DRAWINGS

FIG. 1 illustrates the principle of operation of a radar apparatus according to a first embodiment.

FIGS. 11(A) and 11(B) show antenna arrangements before and after switching in the radar apparatus according to the modification of the second embodiment.

FIG. 12(A) shows an example transmission spectrum of the radar apparatus according to the second embodiment, and FIG. 12(B) shows another example transmission spectrum of the radar apparatus 300A according to the second embodiment.

MODE FOR CARRYING OUT THE INVENTION

Background of Embodiments

First, before the description of radar apparatus according to embodiments of the present disclosure, a problem of the above-described radar system disclosed in Patent document 1 will be described as a background of the embodiments.

Where a target of a radar apparatus is a vehicle, because vehicles have a relatively small number of dominant scattering points that reflect a radar transmission signal, the signal level (reflection intensity) of a radar transmission signal as reflected by the target varies depending on the angle and area of a scattering point on the vehicle. The radar system disclosed in Patent document 1 can suppress a reflection intensity variation because it switches the radar radiation angle by sequential roving.

However, where a target of a radar apparatus is, for example, a pedestrian, a problem arises because the reflection intensities of radar transmission signals reflected from pedestrians and vehicles attenuate according to different mechanisms. In Patent document 1, it is difficult to detect a pedestrian stably when the reflection intensity of a radar transmission signal as reflected by the human body attenuates.

More specifically, in, for example, a millimeter-wave band in which the wavelength is shorter than 1 cm, since a human body can be regarded as a scattering body having a complex shape, scattering waves are generated from plural scattering points when a radar transmission signal is reflected by a human body. Since the scattering waves are combined together spatially in such a manner as to depend on the propagation distance between the radar apparatus and the human and their phases, the reflection intensity of a reflection wave signal received by the radar apparatus becomes very small, that is, what is called multipath fading of mobile communication occurs. As such, the conventional radar apparatus has a problem that it is difficult to detect, in a stable manner, a target (e.g., pedestrian) having many dominant scattering points.

In view of the above, the following embodiments will be directed to example radar apparatus which can detect, in a stable manner, a target (e.g., pedestrian or bicycle) having many scattering points that reflect a radar transmission signal.

Embodiment 1

Figure 2:
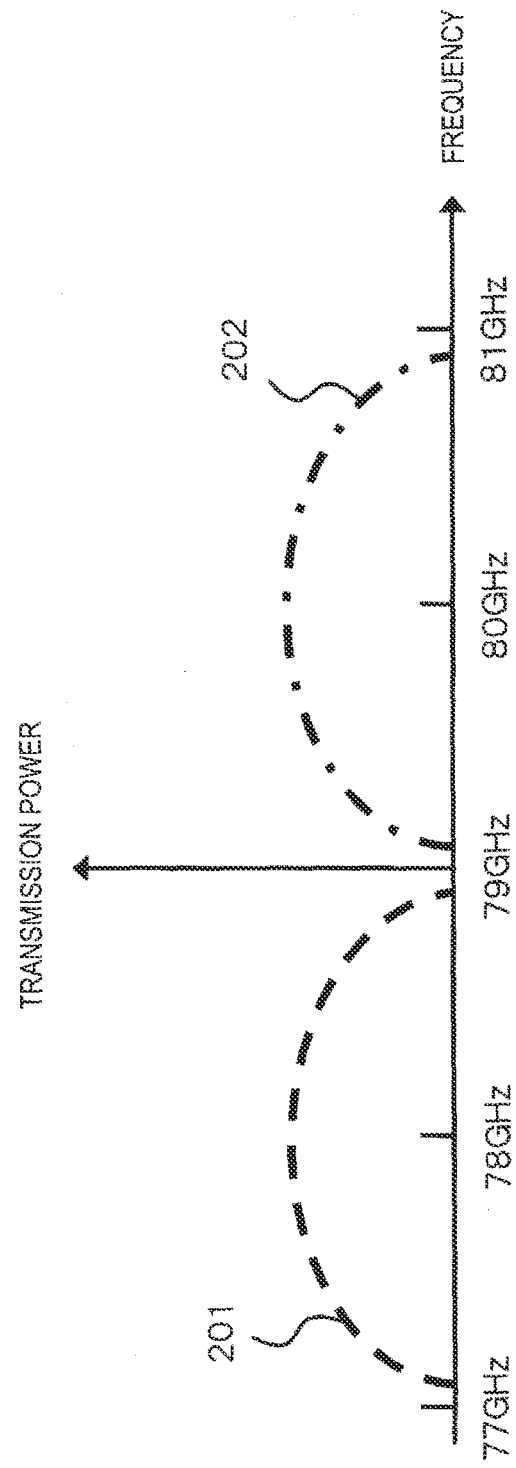
FIG. 2 shows a transmission spectrum of the radar apparatus according to the first embodiment.

FIG. 1 illustrates the principle of operation of a radar apparatus 300 according to a first embodiment. FIG. 2 shows a transmission spectrum of the radar apparatus 300 according to the first embodiment. The radar apparatus 300 according to the first embodiment includes a first radar module 301 and a second radar module 311 (see FIG. 1) which use different frequency bands (e.g., millimeter-wave bands) of radar transmission signals.

The first radar module 301 has a transmission antenna TX1 and a reception antenna RX1. The second radar module 311 has a transmission antenna TX2 and a reception antenna RX2. A detailed internal configuration of the radar apparatus 300 will be described later with reference to FIG. 4.

The radar apparatus 300 according to the first embodiment detects, as a target, an object (e.g., pedestrian or bicycle) having many scattering points that reflect a radar transmission signal. However, it may detect, as a target, an object (e.g., car or bus) whose dominant scattering points are relatively clear. This also applies to the following embodiment.

The human body of a pedestrian PSR shown in FIG. 1 is considered a scattering body which is more complex in shape than vehicles (e.g., cars, trucks, and buses). In, for example, a millimeter-wave band in which the wavelength is shorter than 1 cm, each part (e.g., arm or leg) of a human body is regarded as an independent scattering point.

Therefore, when a radar transmission signal transmitted from each of the first radar module 301 and the second radar module 311 is reflected by the human body of the pedestrian PSR, scattering waves are generated from plural scattering points. The plural scattering waves are received by the reception antenna RX1 of the first radar module 301 and the reception antenna RX2 of the second radar module 311 in the form of multipath waves produced through spatial combining.

In this embodiment, the radar apparatus 300 utilizes frequency diversity in propagation channels of multipath waves that are formed by reflection by a target (e.g., the human body of a pedestrian PSR) of a radar transmission signal transmitted from the transmission antenna TX1 of the first radar module 301 and a radar transmission signal transmitted from the transmission antenna TX2 of the second radar module 311.

For example, assume that the scattering radius R of a human body of about 20 cm in thickness is equal to 8 cm and the carrier wave frequency f of radar transmission signals is in a 79 GHz band (see FIGS. 1 and 2).

Figure 3:
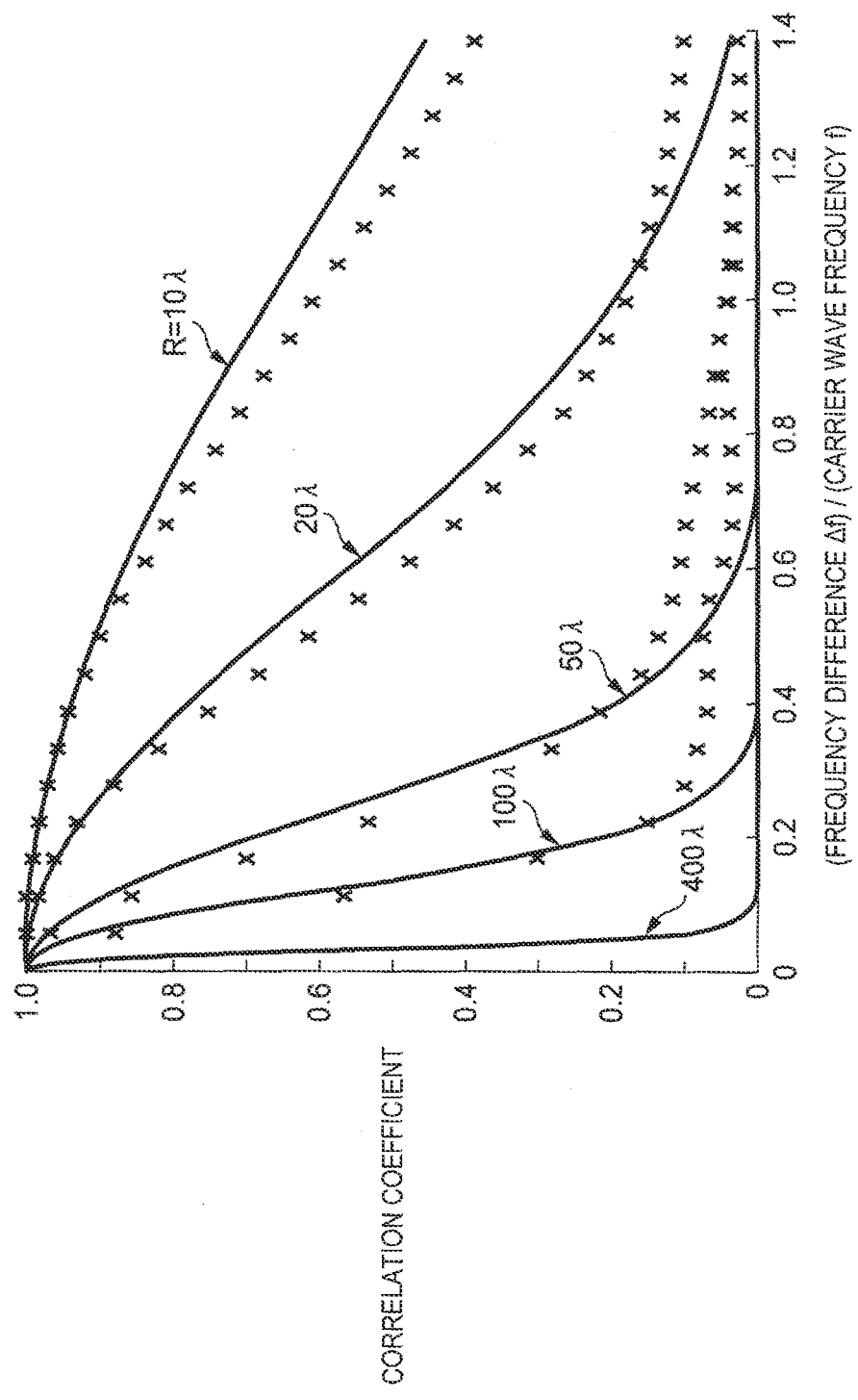
FIG. 3 is a graph showing relationships between the ratio of the frequency difference to the carrier wave frequency and the correlation coefficient.

According to the following Referential non-patent document 1, with assumptions that scattering waves have Gaussian distributions and the scattering radius R and the frequency f are equal to 8 cm and 79 GHz, respectively, the inter-channel correlation is calculated to be smaller than 0.1 when the frequency difference Δf between two channels is larger than 1 GHz (see FIG. 3). FIG. 3 is a graph showing relationships between the ratio of the frequency difference to the carrier wave frequency and the correlation coefficient (refer to Referential non-patent document 1).

(Referential non-patent document 1) J. Fuhl, A. F. Molisch, and E. Bonek, "Unified Channel Model for Mobile Radio Systems with Smart Antennas," Proc. Inst. Electr. Eng.—Radar, Sonar and Navigation, Vol. 145, February 1998, pp. 32-41.

Therefore, in this embodiment, where the frequency bands of radar transmission signals transmitted from the first radar module 301 and the second radar module 311 are separated from each other by more than 1 GHz, the radar apparatus 300 can obtain a sufficiently high frequency diversity gain through combining processing performed by a signal processor 321 even when it receives multipath waves formed by reflection by the human body of a pedestrian PSR.

For a radar apparatus to detect the human body of a pedestrian PSR in such a manner that it is separated from other objects, the radar apparatus is required to exhibit distance resolving performance of less than 30 cm. To attain such high distance resolving performance, a frequency bandwidth of more than 1 GHz is necessary.

In view of the above, in this embodiment, the radar apparatus 300 sets, for example, two different frequency channels having an occupation bandwidth of about 1 to 1.5 GHz and a center frequency difference of about 2 GHz as carrier wave frequency bands to be used by the first radar module 301 and the second radar module 311.

For example, using a 79 GHz band (77 to 81 GHz), the radar apparatus 300 sets a 77 to 79 GHz frequency band as a frequency channel 201 of the first radar module 301 and sets a 79 to 81 GHz band as a frequency channel 202 of the second radar module 311 (see FIG. 2).

Figure 4:
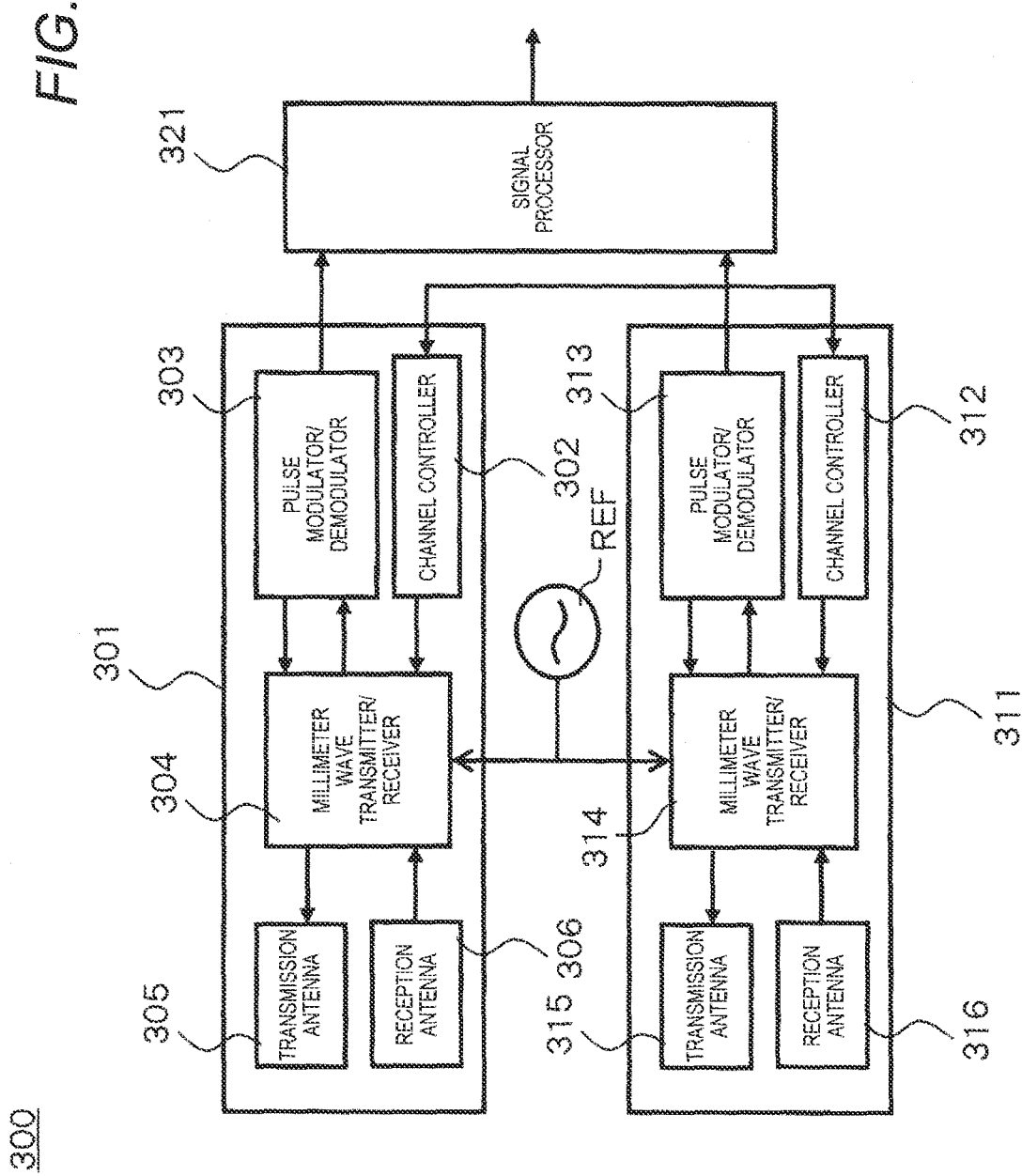
FIG. 4 is a block diagram showing the internal configuration of the radar apparatus according to the first embodiment.

Next, a specific configuration and operation of the radar apparatus 300 according to this embodiment will be described with reference to FIG. 4. FIG. 4 is a block diagram showing the internal configuration of the radar apparatus 300 according to the first embodiment.

As shown in FIG. 4, the radar apparatus 300 includes a reference signal source REF, the first radar module 301, the second radar module 311, and a signal processor 321.

The reference signal source REF generates a reference signal for the 79 GHz band (more specifically, 77 to 81 GHz) used by the radar apparatus 300, and outputs it to a millimeter wave transmitter/receiver 304 of the first radar module 301 and a millimeter wave transmitter/receiver 314 of the second radar module 311.

The signal processor 321 combines outputs of the first radar module 301 and the second radar module 311 and outputs a resulting signal to a post-processing circuit (not shown). The combining processing of the signal processor 321 will be described later.

The first radar module 301 includes a channel controller 302, a pulse modulator/demodulator 303, the millimeter wave transmitter/receiver 304, a transmission antenna 305, and a reception antenna 306. The transmission antenna 305 and the reception antenna 306 correspond to the transmission antenna TX1 and the reception antenna RX1 shown in FIG. 1, respectively.

The second radar module 311 includes a channel controller 312, a pulse modulator/demodulator 313, the millimeter wave transmitter/receiver 314, a transmission antenna 315, and a reception antenna 316. The transmission antenna 315 and the reception antenna 316 correspond to the transmission antenna TX1 and the reception antenna RX shown in FIG. 1, respectively.

In this embodiment, the first radar module 301 and the second radar module 311 operate in the same manner. Therefore, in the following description, the configuration and operation of the first radar module 301, for example, will be described mainly. As for the configuration and operation of the second radar module 311, different items than in the first radar module 301 will be described mainly and descriptions of the same items will be omitted or simplified.

The channel controller 302 generates a channel control signal for selection of a 77-79 GHz band, for example, as a frequency band of a radar transmission signal to be transmitted from the first radar module 301, and outputs it to the millimeter wave transmitter/receiver 304.

The channel controller 312 generates a channel control signal for selection of a 79-81 GHz band, for example, as a frequency band of a radar transmission signal to be transmitted from the second radar module 311, and outputs it to the millimeter wave transmitter/receiver 314.

The channel controllers 302 and 312 adjust frequency bands to be used by the respective radar modules by exchanging pieces of information indicating frequency bands of radar transmission signals transmitted from the first radar module 301 and the second radar module 311.

For example, the channel controller 302 generates a channel control signal for selection of the frequency channel 201 (77 to 79 GHz) as a frequency band of a radar transmission signal to be transmitted from the first radar module 301. And the channel controller 312 generates a channel control signal for selection of the frequency channel 202 (79 to 81 GHz) as a frequency band of a radar transmission signal to be transmitted from the second radar module 311.

Figure 5:
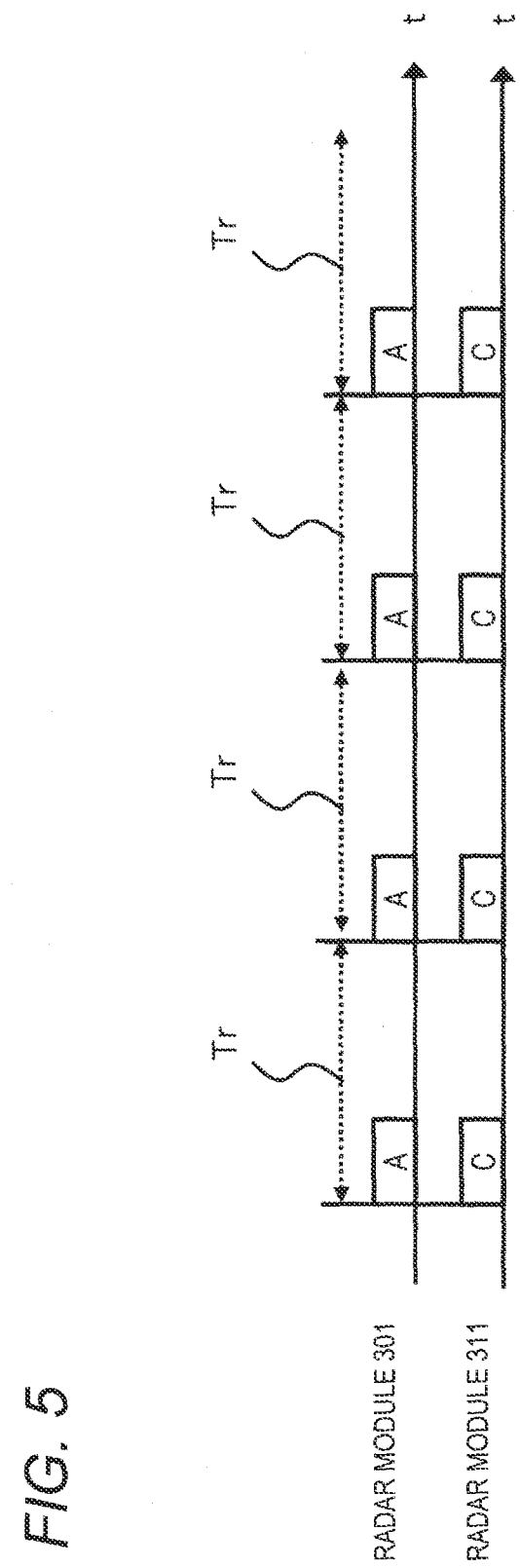
FIG. 5 illustrates transmission pulse signals that are generated in respective transmission cycles by each radar module of the radar apparatus according to the first embodiment.

The pulse modulator/demodulator 303, which is set as holding a prescribed transmission code sequence, generates intermittent transmission pulse signals by performing prescribed modulation using the transmission code sequence (e.g., transmission code sequence A) and outputs them to the millimeter wave transmitter/receiver 304 (see FIG. 5). In this embodiment, the transmission code sequence A may be any code sequence.

The pulse modulator/demodulator 313, which is set as holding a prescribed transmission code sequence, generates intermittent transmission pulse signals by performing prescribed modulation using the transmission code sequence (e.g., transmission code sequence C) and outputs them to the millimeter wave transmitter/receiver 314 (see FIG. 5). In this embodiment, the transmission code sequence C may be any code sequence and may be the same as the transmission code sequence A that is held by the pulse modulator/demodulator 313.

FIG. 5 illustrates transmission pulse signals that are generated in respective transmission cycles Tr by each radar module of the radar apparatus 300 according to the first embodiment. As shown in FIG. 5, in the first radar module 301, the pulse modulator/demodulator 303 generates a transmission pulse signal in every transmission cycle Tr using the transmission code sequence A. As in the first radar module 301, in the second radar module 311 the pulse modulator/demodulator 313 generates a transmission pulse signal in every transmission cycle Tr using the transmission code sequence C.

The millimeter wave transmitter/receiver 304 sets the frequency band of a radar transmission signal to be transmitted from the first radar module 301 (to a 77-79 GHz band, for example) according to a channel control signal generated by the channel controller 302. The millimeter wave transmitter/receiver 304 generates a radio-frequency (e.g., millimeter wave) radar transmission signal using the reference signal generated by the reference signal source REF and the transmission pulse signal generated by the pulse modulator/demodulator 303, and outputs it to the transmission antenna 305.

The transmission antenna 305 transmits the radar transmission signal generated by the millimeter wave transmitter/receiver 304 to the space where a target exists. Radar transmission signals are transmitted from the transmission antenna 305 and the transmission antenna 315 in the same direction in such a manner that they overlap with each other in main beam directivity, which also applies to the following embodiment (see FIGS. 1 and 7).

The radar transmission signal transmitted from the transmission antenna 305 is reflected by plural dominant scattering points on the target (e.g., the human body of a pedestrian), travels through the space in the form of multipath waves, and is received by the reception antenna 306.

Likewise, the radar transmission signal transmitted from the transmission antenna 315 is reflected by plural dominant scattering points on the target (e.g., the human body of a pedestrian), travels through the space in the form of multipath waves, and is received by the reception antenna 316.

The reception antenna 306 receives the radar reflection signal which is multipath waves and outputs a resulting signal to the millimeter wave transmitter/receiver 304. Likewise, the reception antenna 316 receives the radar reflection signal which is multipath waves and outputs a resulting signal to the millimeter wave transmitter/receiver 314.

The millimeter wave transmitter/receiver 304 converts the reception radio-frequency radar reflection signal of the antenna 306 into a baseband or intermediate-frequency (IF) reception signal, and outputs the latter to the pulse modulator/demodulator 303.

The pulse modulator/demodulator 303 performs envelope detection or quadrature detection on the baseband or intermediate-frequency reception signal, and outputs a reception pulse signal (detection result signal) to the signal processor 321. Likewise, the pulse modulator/demodulator 313 performs envelope detection or quadrature detection on the baseband or intermediate-frequency reception signal, and outputs a reception pulse signal (detection result signal) to the signal processor 321.

The signal processor 321 combines the reception pulse signal (detection result signal) of the pulse modulator/demodulator 303 and that of the pulse modulator/demodulator 313. More specifically, the signal processor 321 improves the reception SNR (signal-to-noise radio) by performing coherent integration on reception pulse signals of a prescribed number of transmission cycles, and then performs combining processing which is one of selection combining, equal gain combining, and maximum ratio combining.

The signal processor 321 compares the level of a combined signal (i.e., a result of one of the above kinds of combining processing) with a prescribed threshold value which is held by the signal processor 321, for example. When judging that, for example, the level of a combined signal is higher than the prescribed threshold value as a result of the comparison, the signal processor 321 judges that a target has been detected. Alternatively, the signal processor 321 may abstain from comparing the combined signal with the prescribed threshold value and output the combined signal (i.e., the result of one of the above kinds of combining processing) to a post-processing circuit (not shown).

As described above, in the radar apparatus 300 according to the embodiment, the plural (e.g., two) radar modules transmit respective radar transmission signals whose frequency bands are separated from each other by, for example, more than 1 GHz in every transmission cycle Tr with the same transmission timing in such a manner that they overlap with each other in main beam directivity.

Furthermore, in the radar apparatus 300, the plural (e.g., two) radar modules receive radar reflection signals each of which is multipath waves which are produced as a result of spatial combining of scattering waves reflected from plural scattering points on the target (the human body of a pedestrian PSR). The signal processor 321 combines baseband or intermediate-frequency detection signals.

Operating in the above-described manner, the radar apparatus 300 can obtain a frequency diversity gain by suppressing a fading variation due to multipath waves formed by reflection by plural dominant scattering points on a target (the human body of a pedestrian PSR). Thus, the radar apparatus 300 can detect a target (e.g., pedestrian) having many dominant scattering points in a stable manner.

Furthermore, since the plural (e.g., two) radar modules use plural kinds of frequency bands of radar transmission signals, the radar apparatus 300 can suppress a fading variation due to multipath waves whereas securing avoidance to interference with other radar apparatus (not shown).

Incidentally, the scattering radius R at each scattering point on a human body of a pedestrian PSR does not depend on the distance between the pedestrian PSR and the radar apparatus 300, the radar apparatus 300 can detect a distant target (e.g., several tens of meters away) as well as a short-range target.

Figure 6:
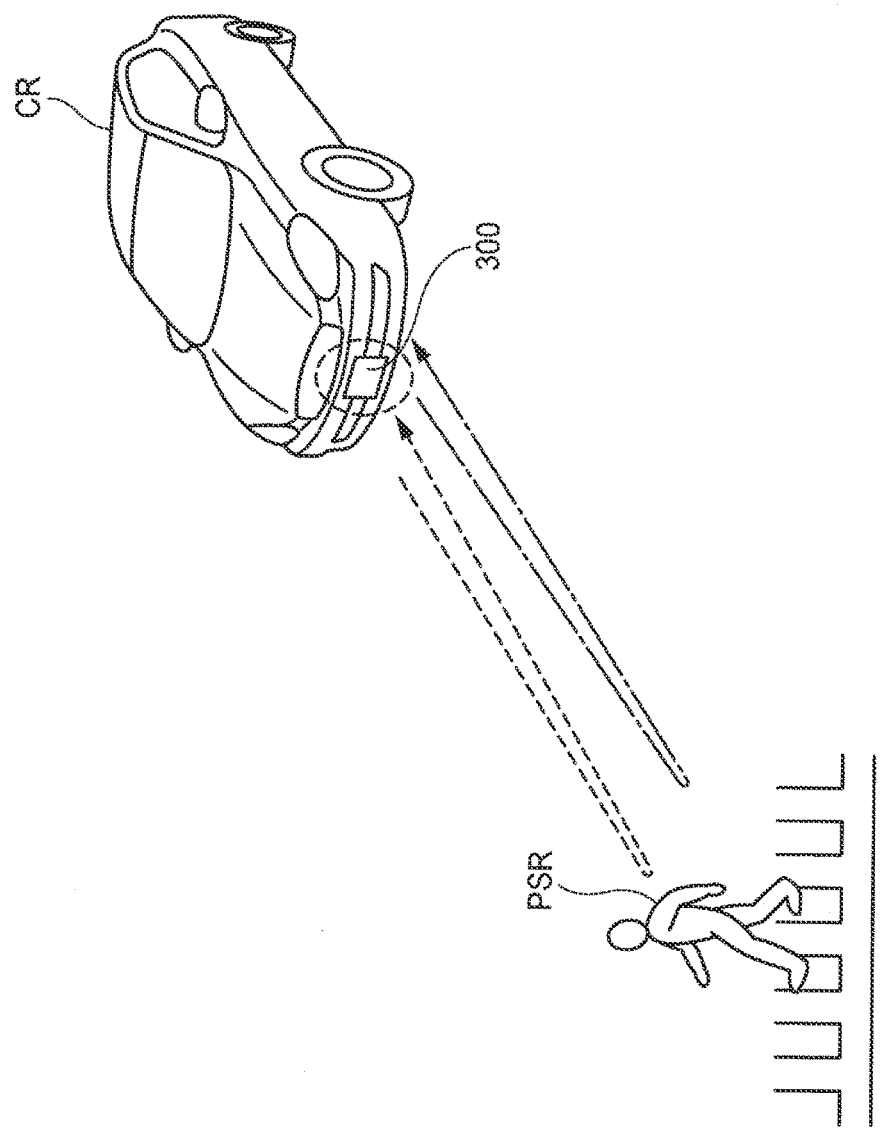
FIG. 6 shows an example use of the radar apparatus according to the first embodiment in which it is used as a vehicle-mounted radar apparatus.

FIG. 6 shows an example use of the radar apparatus 300 according to the first embodiment in which it is used as a vehicle-mounted radar apparatus. Where the radar apparatus 300 according to the embodiment is attached to a prescribed front portion (e.g., bumper) of a car CR, the radar apparatus 300 can detect a target (e.g., pedestrian) ahead of the car CR.

For example, in the case of using millimeter waves in a 79 GHz band, the radar apparatus 300 which can be miniaturized can easily be installed to behind the bumper of a car CR. The bumper is an example installation location of the radar apparatus 300, and there are no particular limitations on its installation location on a car CR.

In vehicle-mounted radar apparatus, it is expected that the target and the interference resistance requirements vary depending on the running scene such as following a vehicle ahead, entrance into an intersection, and running in a parking lot. For example, where a vehicle-mounted radar apparatus is to detect four-wheel vehicles (targets) mainly, the resolution performance requirement is not severe and hence the interference resistance can be increased by narrowing the frequency bands of respective radar transmission signals.

On the other hand, where a vehicle-mounted radar apparatus is to detect pedestrians (targets) who are in a relatively short distance range, the frequency bands of respective radar transmission signals are widened to prioritize the resolution performance.

Therefore, although the radar apparatus 300 according to the embodiment has been described for the case of using the transmission spectrum shown in FIG. 2 which includes the two frequency channels located on the two respective sides of the center frequency 79 GHz, for a certain driving scene or use scene, the radar apparatus 300 may use, for example, four divisional frequency channels having a width of 1 GHz. Even in the case of using two frequency channels, the frequency difference between radar transmission signals may be varied adaptively.

Embodiment 2

Figure 7:
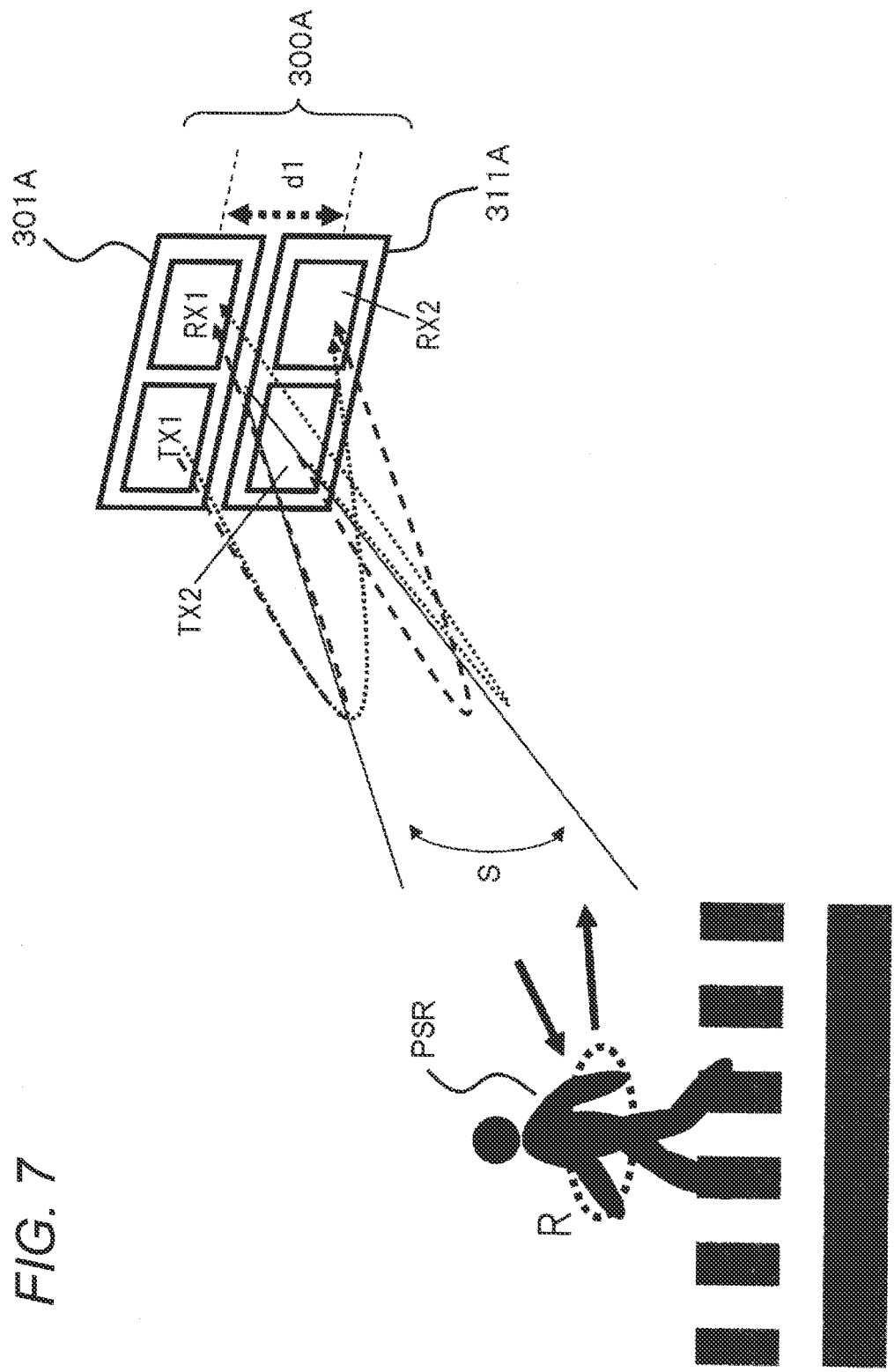
FIG. 7 illustrates the principle of operation of a radar apparatus according to a second embodiment.

FIG. 7 illustrates the principle of operation of a radar apparatus 300A according to a second embodiment. The radar apparatus 300A according to this embodiment includes a first radar module 301A and a second radar module 311A (see FIG. 7) which use the same frequency band (e.g., millimeter-wave band) as frequency bands of radar transmission signals.

The first radar module 301A has a transmission antenna TX1 and a reception antenna RX1. The second radar module 311A has a transmission antenna TX2 and a reception antenna RX2. A detailed internal configuration of the radar apparatus 300A will be described later with reference to FIG. 8.

In this embodiment, the radar apparatus 300A utilizes space diversity in propagation channels of multipath waves that are formed by reflection by a target (e.g., the human body of a pedestrian) of a radar transmission signal transmitted from the transmission antenna TX1 of the first radar module 301A and a radar transmission signal transmitted from the transmission antenna TX2 of the second radar module 311A.

Therefore, to obtain a space diversity effect in detecting a target, the first radar module 301A and the second radar module 311A are arranged in such a manner as to be different from each other in antenna vertical installation height (see FIG. 7). The antenna distance d between the first radar module 301A and the second radar module 311A is set at d1 (see FIG. 7).

The human body of a pedestrian PSR shown in FIG. 7 is regarded as a scattering body having a complex shape. For example, because of the shape of the human body, scattering waves reflected by plural scattering points of the pedestrian PSR scatter more in the vertical direction than in the horizontal direction. Therefore, multipath waves formed through spatial combining of plural scattering waves have a wider angle of expansion in the vertical direction.

For example, when it is assumed that the height of a human body as a scattering body is 1 to 1.5 m and the distance between the pedestrian PSR (target) and the first radar module 301A and the second radar module 311A is equal to 20 m, the angle of expansion, S, of multipath waves is calculated to be about 3°.

According to the above-mentioned Referential non-patent document 1, with assumptions that scattering waves have Gaussian distributions and the angle of expansion, S, and the frequency f are equal to 3° and 79 GHz, respectively, the inter-channel correlation is calculated to be smaller than 0.1 when the antenna distance d is longer than five times the wavelength.

Therefore, in this embodiment, where the first radar module 301A and the second radar module 311A use a 79 GHz band as a frequency band of radar transmission signals they transmit, the radar apparatus 300A can obtain a sufficiently high space diversity gain through combining processing performed by a signal processor 321A even when it receives multipath waves formed by reflection by the human body of the pedestrian PSR as long as the first radar module 301A and the second radar module 311A are different from each other in vertical antenna installation height so that their antenna distance d is longer than 2.5 cm which corresponds to five times the wavelength.

In this embodiment, the radar apparatus 300A can transmit plural radar transmission signals in the same transmission cycle while suppressing interference between them by employing the same frequency band in the first radar module 301A and the second radar module 311A and being orthogonalized transmission pulse signals used for generating respective radar transmission signals. In this manner, the radar apparatus 300A can be made equivalent in configuration to a MIMO (multiple input multiple output) radar apparatus.

That is, when a radar transmission signal that is transmitted from the transmission antenna TX1 of the first radar module 301A is reflected by a target, a radar reflection signal (echo) is received by the reception antenna RX1 of the first radar module 301A and another radar reflection signal (cross echo) is received by the reception antenna RX2 of the second radar module 311A.

Furthermore, when a radar transmission signal that is transmitted from the transmission antenna TX2 of the second radar module 311A is reflected by the target, a radar reflection signal (echo) is received by the reception antenna RX1 of the first radar module 301A and another radar reflection signal (cross echo) is received by the reception antenna RX2 of the second radar module 311A.

Figure 8:
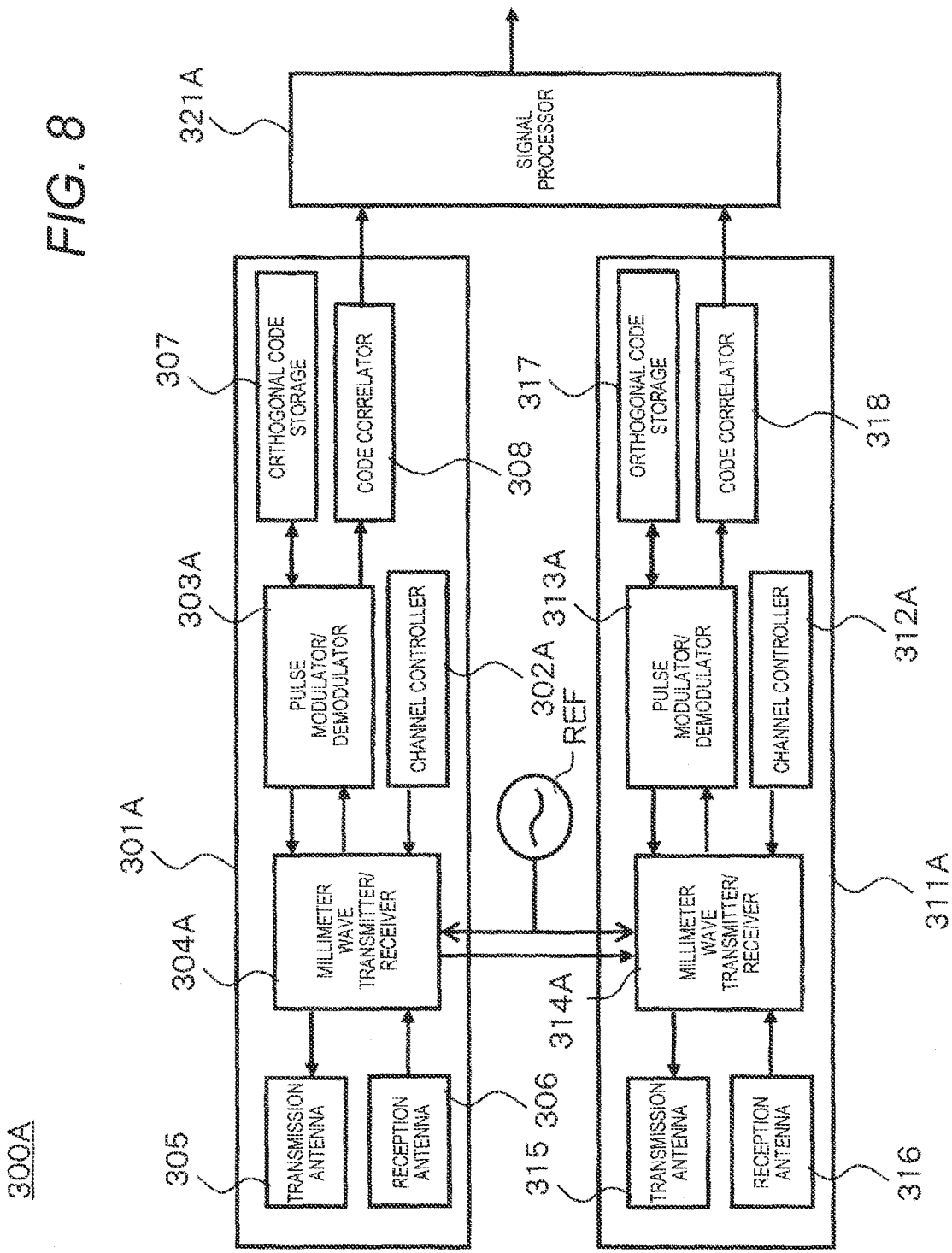
FIG. 8 is a block diagram showing the internal configuration of the radar apparatus according to the second embodiment.

Next, a specific configuration and operation of the radar apparatus 300A according to this embodiment will be described with reference to FIG. 8. FIG. 8 is a block diagram showing the internal configuration of the radar apparatus 300A according to the second embodiment.

As shown in FIG. 8, the radar apparatus 300A includes a reference signal source REF, the first radar module 301A, the second radar module 311A, and a signal processor 321.

As for the configuration and operation of the radar apparatus 300A shown in FIG. 8, items having the same ones in the radar apparatus 300 shown in FIG. 4 will be given the same symbols as the latter and descriptions therefor will be omitted or simplified. Different items will be described mainly.

The first radar module 301A includes a channel controller 302A, a pulse modulator/demodulator 303A, a millimeter wave transmitter/receiver 304A, a transmission antenna 305, a reception antenna 306, an orthogonal code storage 307, and a code correlator 308. The transmission antenna 305 and the reception antenna 306 correspond to the transmission antenna TX1 and the reception antenna RX1 shown in FIG. 7, respectively. This also applies to a description to be made later with reference to FIGS. 11(A) and 11(B).

The second radar module 311A includes a channel controller 312A, a pulse modulator/demodulator 313A, a millimeter wave transmitter/receiver 314A, a transmission antenna 315, a reception antenna 316, an orthogonal code storage 317, and a code correlator 318. The transmission antenna 315 and the reception antenna 316 correspond to the transmission antenna TX1 and the reception antenna RX shown in FIG. 7, respectively. This also applies to the description to be made later with reference to FIGS. 11(A) and 11(B).

In this embodiment, the first radar module 301A and the second radar module 311A operate in the same manner. Therefore, in the following description, the configuration and operation of the first radar module 301A, for example, will be described mainly. As for the configuration and operation of the second radar module 311A, different items than in the first radar module 301A will be described and descriptions of the same items will be omitted or simplified.

The channel controller 302 generates, as a frequency band of a radar transmission signal to be transmitted from the first radar module 301A, a channel control signal for selection of a 79 GHz band, for example, which is the same frequency band as used by the second radar module 311A, and outputs it to the millimeter wave transmitter/receiver 304A. The 79 GHz frequency band which is selected by the channel controller 302A is an example, and the channel controller 302A may select any frequency band in a 77 to 81 GHz range as long as it is the same as selected by the channel controller 312A.

The channel controller 312 generates, as a frequency band of a radar transmission signal to be transmitted from the second radar module 311A, a channel control signal for selection of the 79 GHz band, for example, which is the same frequency band as used by the first radar module 301A, and outputs it to the millimeter wave transmitter/receiver 304A. The 79 GHz frequency band which is selected by the channel controller 312A is an example, and the channel controller 312A may select any frequency band in the 77 to 81 GHz range as long as it is the same as selected by the channel controller 302A.

The orthogonal code storage 307 is stored with an orthogonal code for orthogonalizing a radar transmission signal transmitted from the first radar module 301A and a radar transmission signal transmitted from the second radar module 311A. For example, the orthogonal code storage 307 is stored with an orthogonal code AB=[1, 1] of a 2-bit Walsh code ([1, 1] and [1, −1]).

In a certain transmission cycle, the pulse modulator/demodulator 303A, which holds a prescribed transmission code sequence, generates one of intermittent transmission pulse signals by performing prescribed modulation using the orthogonal code A, for example, of the orthogonal code AB= [1, 1] stored in the orthogonal code storage 307A and the transmission code sequence, and outputs it to the millimeter wave transmitter/receiver 304A and the code correlator 308.

In the next transmission cycle, the pulse modulator/demodulator 303A generates one of intermittent transmission pulse signals by performing prescribed modulation using the orthogonal code B, for example, of the orthogonal code AB= [1, 1] stored in the orthogonal code storage 307A and the transmission code sequence, and outputs it to the millimeter wave transmitter/receiver 304A.

The orthogonal code storage 317 is stored with an orthogonal code for orthogonalizing a radar transmission signal transmitted from the first radar module 301A and a radar transmission signal transmitted from the second radar module 311A. For example, the orthogonal code storage 317 is stored with an orthogonal code CD=[1, −1] of the 2-bit Walsh code ([1, 1] and [1, −1]).

In a certain transmission cycle, the pulse modulator/demodulator 313A, which is set as holding the same prescribed transmission code sequence as the pulse modulator/demodulator 303A, generates one of intermittent transmission pulse signals by performing prescribed modulation using the orthogonal code C, for example, of the orthogonal code CD= [1, −1] stored in the orthogonal code storage 317A and the transmission code sequence, and outputs it to the millimeter wave transmitter/receiver 314A and the code correlator 318.

In the next transmission cycle, the pulse modulator/demodulator 303A generates one of intermittent transmission pulse signals by performing prescribed modulation using the orthogonal code D, for example, of the orthogonal code AB= [1, 1] stored in the orthogonal code storage 317A and the transmission code sequence, and outputs it to the millimeter wave transmitter/receiver 314A.

Figure 9:
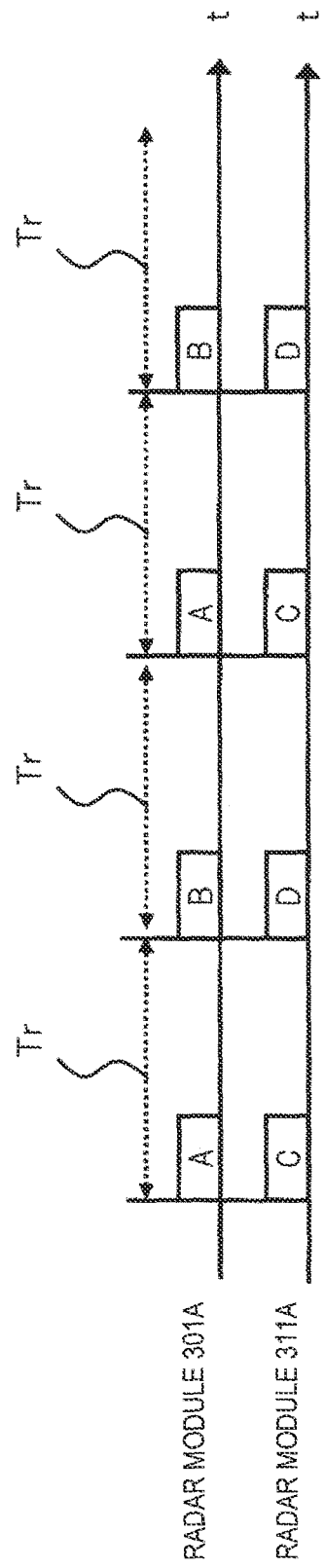
FIG. 9 illustrates transmission pulse signals that are generated in respective transmission cycles by each radar module of the radar apparatus according to the second embodiment.

FIG. 9 illustrates transmission pulse signals that are generated in respective transmission cycles Tr by each radar module of the radar apparatus 300A according to the second embodiment. As shown in FIG. 9, in the first radar module 301A, in each odd-numbered transmission cycle Tr the pulse modulator/demodulator 303A generates a transmission pulse signal using the orthogonal code A and the prescribed transmission code sequence. In each even-numbered transmission cycle Tr, the pulse modulator/demodulator 303A generates a transmission pulse signal using the orthogonal code B and the prescribed transmission code sequence.

As in the first radar module 301, in the second radar module 311 the pulse modulator/demodulator 313A generates, in each odd-numbered transmission cycle Tr, a transmission pulse signal using the orthogonal code C and the prescribed transmission code sequence. In each even-numbered transmission cycle Tr, the pulse modulator/demodulator 313A generates a transmission pulse signal using the orthogonal code D and the prescribed transmission code sequence.

Since as described above the first radar module 301A and the second radar module 311A transmit orthogonal radar transmission signals, the radar apparatus 300A according to this embodiment can form four propagation channels that are independent of each other spatially while suppressing interference between the radar transmission signals, whereby a 2×2 MIMO radar apparatus can be realized.

In FIG. 9, the first radar module 301A and the second radar module 311A transmit radar transmission signals in the same transmission cycle with the same transmission timing. Alternatively, the radar modules may transmit radar transmission signals with a shift in transmission timing or in different transmission cycles Tr.

The millimeter wave transmitter/receiver 304A sets the frequency band of a radar transmission signal to be transmitted from the first radar module 301A (to a 79 GHz band, for example) according to a channel control signal generated by the channel controller 302A. The millimeter wave transmitter/receiver 304A generates a radio-frequency (e.g., millimeter wave) radar transmission signal using the reference signal generated by the reference signal source REF and the transmission pulse signal generated by the pulse modulator/demodulator 303A, and outputs it to the transmission antenna 305.

The millimeter wave transmitter/receiver 314A is supplied with a reference clock signal of an internal circuit of the millimeter wave transmitter/receiver 304A. With this measure, in the radar apparatus 300A, phase coherence can be secured between the first radar module 301A and the second radar module 311A and fading due to multipath waves can be suppressed. Furthermore, the first radar module 301A and the second radar module 311A can function as modules of a MIMO radar apparatus and sufficiently high diversity gain can be obtained. It is noted that in the first embodiment the millimeter wave transmitter/receiver 314 may be supplied with a reference clock signal of an internal circuit of the millimeter wave transmitter/receiver 304.

The pulse modulator/demodulator 303A performs envelope detection or quadrature detection on a baseband or intermediate-frequency reception signal, and outputs a reception pulse signal (detection result signal) to the code correlator 308. Likewise, the pulse modulator/demodulator 313A performs envelope detection or quadrature detection on a baseband or intermediate-frequency reception signal, and outputs a reception pulse signal (detection result signal) to the code correlator 318.

The code correlator 308 calculates respective code correlation values for an echo of the first radar module 301A and a cross echo of the second radar module 311A using the transmission pulse signal generated by the pulse modulator/demodulator 303A and the reception pulse signal (detection result signal) generated through the detection by the pulse modulator/demodulator 303A. The code correlator 308 outputs the two code correlation values (calculation results) to the signal processor 321A.

Like the code correlator 308, the code correlator 318 calculates respective code correlation values for an echo of the second radar module 311A and a cross echo of the first radar module 301A using the transmission pulse signal generated by the pulse modulator/demodulator 313A and the reception pulse signal (detection result signal) generated through the detection by the pulse modulator/demodulator 313A. The code correlator 318 outputs the two code correlation values (calculation results) to the signal processor 321A.

The signal processor 321 combines the two code correlation values (code correlation results) of the code correlator 308 and the two code correlation values (code correlation results) of the code correlator 318. More specifically, the signal processor 321A performs, on the four code correlation values, combining processing which is one of selection combining, equal gain combining, maximum ratio combining.

The signal processor 321A compares the level of a combined signal (i.e., a result of one of the above kinds of combining processing) with a prescribed threshold value which is held by the signal processor 321A, for example. When judging that, for example, the level of a combined signal is higher than the prescribed threshold value as a result of the comparison, the signal processor 321A judges that a target has been detected. Alternatively, the signal processor 321A may abstain from comparing the combined signal with the prescribed threshold value and output the combined signal (i.e., the result of one of the above kinds of combining processing) to a post-processing circuit (not shown).

As described above, in the radar apparatus 300A according to the embodiment transmit orthogonal radar transmission signals in the same frequency band with the same transmission timing in such a manner that the first radar module 301A and the second radar module 311A have the vertical antenna distance d.

In the radar apparatus 300A, the plural (e.g., two) radar modules receive radar reflection signals each of which is multipath waves which are produced as a result of spatial combining of scattering waves reflected from plural scattering points on the target (the human body of a pedestrian PSR). And the plural (e.g., two) radar modules calculate respective code correlation values for an echo of the first radar module 301A and a cross echo of the second radar module 311A and respective code correlation values for an echo of the second radar module 311A and a cross echo of the first radar module 301A.

Furthermore, in the radar apparatus 300A, the signal processor 321A combines total of four code correlation calculation results.

Operating in the above-described manner, the radar apparatus 300A can obtain a space diversity gain for four propagation channels and hence can suppress a fading variation due to multipath waves formed by reflection by plural scanning points on a target (the human body of a pedestrian PSR). Thus, the radar apparatus 300A can obtain a higher diversity gain (space diversity gain) than the radar apparatus 300A according to the first embodiment and hence can detect a target (e.g., pedestrian) having many dominant scattering points in a stable manner.

Furthermore, the radar apparatus 300A uses a single frequency band as frequency bands of radar transmission signals transmitted from the plural (e.g., two) radar modules. Therefore, even where plural radar apparatus 300A are installed as vehicle-mounted radar apparatus, the plural radar apparatus 300A can use different frequency bands of radar transmission signals. Therefore, a fading variation due to multipath waves can be suppressed between the plural radar apparatus 300A whereas each radar apparatus 300 can secure high resistance to interference with other radar apparatus.

As described above, in a 79 GHz band, the distance resolution can be increased by using a bandwidth of a maximum of 4 GHz and hence it is also possible to detect objects that are smaller than human bodies or producing a rough image of such an object as a vehicle. That is, the resolution performance or the resolution of a radio-wave image can be increased by using a 4 GHz bandwidth as a single frequency channel 1205 (see FIG. 12(B)) instead of dividing it into four 1-GHz frequency channels (see FIG. 12(A)). FIG. 12(A) shows an example transmission spectrum of the radar apparatus 300A according to the second embodiment. FIG. 12(B) shows another example transmission spectrum of the radar apparatus 300A according to the second embodiment.

Modification of Embodiment 2

In the second embodiment, the distance within which the radar apparatus 300A can detect a target in a stable manner depends on the antenna distance d of the first radar module 301A and the second radar module 311A. For example, where the antenna distance d is equal to about five times the wavelength of millimeter waves of in a 79 GHz frequency band, a fixed detectable distance of 20 m is obtained.

In a radar apparatus 300B according to a modification of the second embodiment, an antenna switcher 319 switches the distance between transmission antennas of a radar module 301B and between its reception antennas dynamically to thereby vary the detectable distance in which a target can be detected stably.

Figure 10:
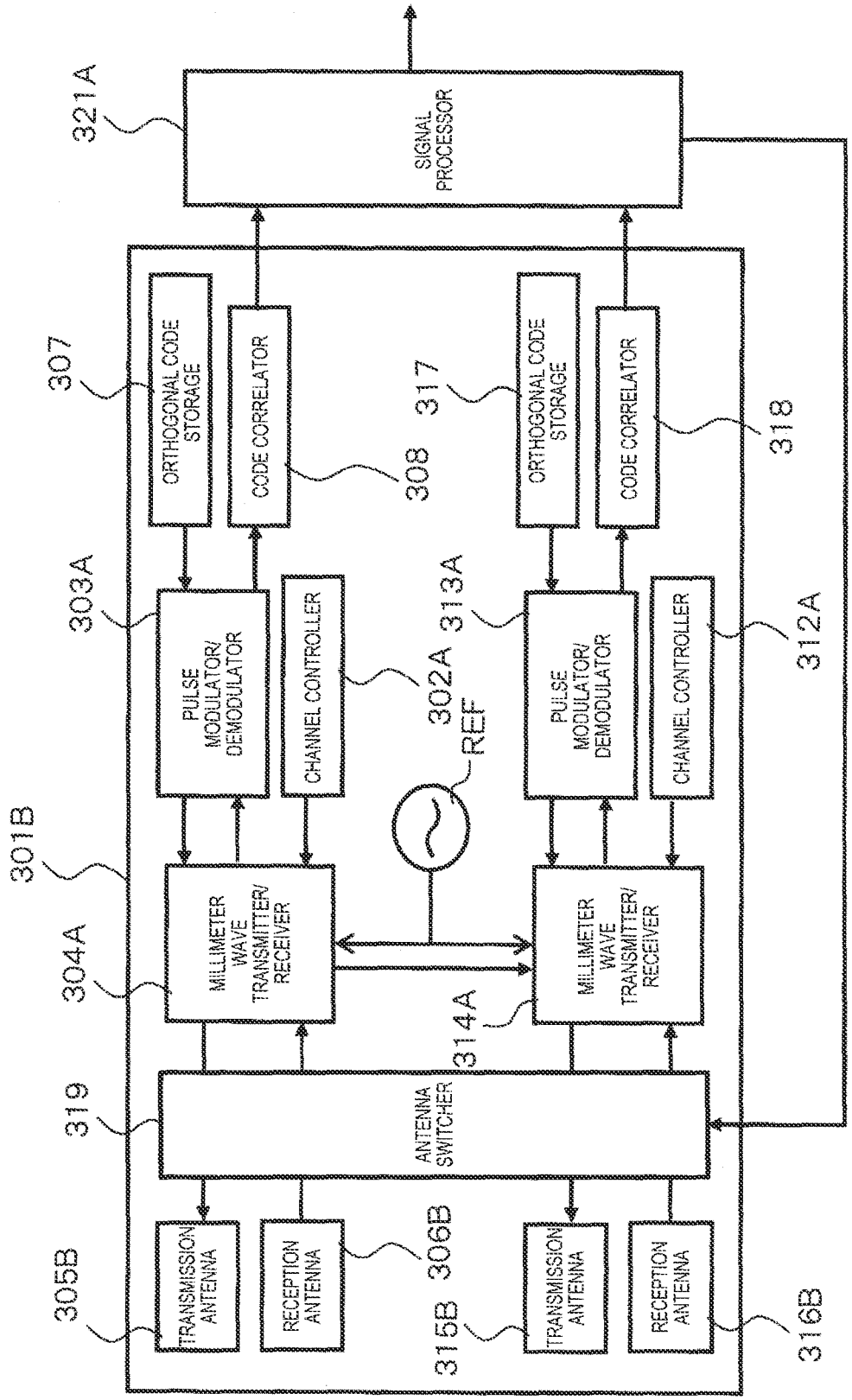
FIG. 10 is a block diagram showing the internal configuration of a radar apparatus according to a modification of the second embodiment.

FIG. 10 shows the internal configuration of the radar apparatus 300B according to the modification of the second embodiment. The radar apparatus 300B shown in FIG. 10 includes the radar module 301B and a signal processor 321A.

The radar module 301B includes a reference signal source REF, a channel controller 302A, a pulse modulator/demodulator 303A, a millimeter wave transmitter/receiver 304A, the antenna switcher 319, a transmission antenna 305B, a reception antenna 306B, an orthogonal code storage 307, a code correlator 308, a channel controller 312A, a pulse modulator/demodulator 313A, a millimeter wave transmitter/receiver 314A, a transmission antenna 315B, a reception antenna 316B, an orthogonal code storage 317, and a code correlator 318.

As for the configuration and operation of the radar apparatus according to this modification, items having the same ones in the radar apparatus 300A according to the second embodiment (see FIG. 8) will be given the same symbols as the latter and descriptions therefor will be omitted or simplified. Different items will be described mainly. FIGS. 11(A) and 11(B) show antenna arrangements before and after switching in the radar apparatus 300B according to the modification of the second embodiment.

The antenna switcher 319 switches the connections between the transmission antennas 305B and 315B and the reception antennas 306 and 316B and the millimeter wave transmitter/receivers 304A and 314A according the kind of a target to be detected by the radar apparatus 300B (see FIGS. 11(A) and 11(B)). That is, the antenna switcher 319 switches the antenna distance d between the transmission antenna 305B/reception antenna 306B and the transmission antenna 315B/reception antenna 316B to an antenna distance d1 shown in FIG. 11(A) or an antenna distance d2 shown in FIG. 11(B).

More specifically, when the kind of a target detected by the radar apparatus 300B is, for example, a pedestrian and a radar reflection signal reflected from the target has an angular spread in the vertical direction, the antenna switcher 319 switches the antenna distance d between the transmission antenna 305B/reception antenna 306B and the transmission antenna 315B/reception antenna 316B to d1 (see FIG. 11(A)).

With this measure, the radar apparatus 300B provides the same advantage as the radar apparatus 300 according to the second embodiment. For example, a detectable range of 20 m is obtained in the case where the antenna distance d1 is about five times the wavelength of millimeter waves in a 79 GHz frequency band.

On the other hand, when the kind of a target detected by the radar apparatus 300B is, for example, a motorcycle and a radar reflection signal reflected from the target has an angular spread in the horizontal direction, the antenna switcher 319 switches the antenna distance d between the transmission antenna 305B/reception antenna 306B and the transmission antenna 315B/reception antenna 316B to d2 (see FIG. 11(B)).

With this measure, the radar apparatus 300B provides a detectable range of 40 m in the case where the antenna distance d2 is about 10 times the wavelength of millimeter waves in a 79 GHz frequency band.

Furthermore, the radar apparatus 300B provides the above-described space diversity effect because it is configured in such a manner that the directivity patterns of the transmission antennas 305B and 315B overlap or fully coextend with each other to enable radiation of radio waves in the same direction. Likewise, the directivity patterns of the reception antennas 306B and 316B overlap or fully coextend with each other to enable reception of radio waves coming from the same direction, which also contributes to the realization of the space diversity effect.

In actuality, in a configuration in which directivity patterns overlap with each other, a space diversity effect is obtained in an overlap angular range. Furthermore, since this increases the detectable angular range of the radar apparatus 300B, the detection range can be increased (i.e., a wide "angle of view" is obtained). That is, whereas the pedestrian detection performance is enhanced in a particular direction, the antenna beam scanning angular range of the entire radar apparatus 300B can be increased. For example, in a radar apparatus that is mounted on a vehicle as part of a vehicular device, whereas the detection rate of human bodies which are located at prescribed heights from a road surface is increased, influences of objects to cause radar clutter (strong extraneous reflection waves) such as billboards can be suppressed by vertical beam scanning or beam switching.

Although the various embodiments have been described above with reference to the drawings, it goes without saying that this disclosure is not limited to those examples. It is apparent that those skilled in the art would conceive various changes or modifications within the confines of the claims. And such changes or modifications should naturally be construed as being included in the technical scope of the disclosure.

The present application is based on Japanese Patent Application No. 2013-055564 filed on Mar. 18, 2013, the disclosure of which is incorporated herein by reference.

INDUSTRIAL APPLICABILITY

This disclosure is useful when applied to radar apparatus for detecting a target having many scattering points that reflect a radar transmission signal.

DESCRIPTION OF REFERENCE SIGNS 300, 300A, 300B: Radar Apparatus
301, 301A: First Radar Module
311, 311A: Second Radar Module
301B: Radar Module
302, 302A, 312, 312A: Channel Controller
303, 303A, 313, 313A: Pulse Modulator/Demodulator
304, 314: Millimeter Wave Transmitter/Receiver
305, 305B, 315, 315B: Transmission Antenna
306, 306B, 316, 316B: Reception Antenna
307, 317: Orthogonal Code Storage
308, 318: Code Correlator
319: Antenna Switcher
321, 321A: Signal Processor
REF: Reference Signal Source

The invention claimed is:

1. A radar device comprising:
a first radar module;
a second radar module; and
a signal processor which, in operation, combines outputs of the first radar module and the second radar module,
wherein the first radar module comprises:
   a first channel controller which, in operation, sets a frequency band of a first carrier wave to a frequency band different from a frequency band of a second carrier wave; and
   a first radar transmitter and receiver which, in operation, transmits a radio-frequency first radar transmission signal generated using a prescribed first transmission code sequence and the first carrier wave, which, in operation, receives a first radar reflection signal produced as a result of reflection of the first radar transmission signal by a target, and which, in operation, converts the first radar reflection signal into a baseband first reception signal,
wherein the second radar module comprises:
   a second channel controller which, in operation, sets the frequency band of the second carrier wave to a frequency band different from the frequency band of the first carrier wave; and
   a second radar transmitter and receiver which, in operation, transmits a radio-frequency second radar transmission signal generated using a prescribed second transmission code sequence and the second carrier wave, which, in operation, receives a second radar reflection signal produced as a result of reflection of the second radar transmission signal by the target, and which, in operation, converts the second radar reflection signal into a baseband second reception signal, and
wherein a part of main beam directivity of the first radar transmission signal overlaps with a part of main beam directivity of the second radar transmission signal.

2. The radar device according to claim 1,
wherein the first channel controller sets the frequency band of the first carrier wave to a frequency band in which a difference between the first carrier wave and the second carrier wave becomes more than 1 GHz, and
wherein the second channel controller sets the frequency band of the second carrier wave to a frequency band in which a difference between the second carrier wave and the first carrier wave becomes more than 1 GHz.

3. The radar device according to claim 1,
wherein the signal processor performs combining processing on the outputs of the first radar module and the second radar module, by one of selection combining, equal gain combining, and maximum ratio combining.

* * * * *